(12) United States Patent
Williams

(10) Patent No.: US 8,514,872 B2
(45) Date of Patent: Aug. 20, 2013

(54) ACCESSORY QUEUE MANAGEMENT SYSTEM AND METHOD FOR INTERACTING WITH A QUEUING SYSTEM

(75) Inventor: Mark Williams, North Canton, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 0 days.

(21) Appl. No.: 11/820,253

(22) Filed: Jun. 19, 2007

(65) Prior Publication Data

US 2008/0317058 A1    Dec. 25, 2008

(51) Int. Cl.
*H04L 12/28* (2006.01)

(52) U.S. Cl.
USPC ...................................... 370/412; 379/266.01

(58) Field of Classification Search
USPC .................. 370/412–418, 429; 379/266.01, 379/266.02, 266.03, 266.04, 309
See application file for complete search history.

(56) References Cited

U.S. PATENT DOCUMENTS

| | | | |
|---|---|---|---|
| 5,371,787 A | 12/1994 | Hamilton | |
| 5,430,792 A | 7/1995 | Jesurum et al. | |
| 5,506,898 A | 4/1996 | Costantini et al. | |
| 5,581,602 A | 12/1996 | Szlam et al. | |
| 5,627,884 A | 5/1997 | Williams et al. | |
| 5,724,420 A | 3/1998 | Torgrim | |
| 5,828,731 A * | 10/1998 | Szlam et al. | 379/88.16 |
| 5,982,873 A * | 11/1999 | Flockhart et al. | 379/266.02 |
| 6,041,116 A | 3/2000 | Meyers | |
| 6,157,655 A * | 12/2000 | Shtivelman | 370/412 |
| 6,278,777 B1 | 8/2001 | Morley et al. | |
| 6,301,350 B1 * | 10/2001 | Henningson et al. | 379/220.01 |
| 6,546,097 B1 | 4/2003 | Peltz | |
| 6,563,921 B1 | 5/2003 | Williams et al. | |
| 6,584,191 B1 | 6/2003 | McPartlan et al. | |
| 6,665,396 B1 * | 12/2003 | Khouri et al. | 379/266.01 |
| 6,694,009 B1 | 2/2004 | Anderson et al. | |
| 6,728,363 B2 | 4/2004 | Lieberman et al. | |
| 6,741,689 B2 | 5/2004 | Burg | |
| 6,748,060 B2 | 6/2004 | Lee et al. | |
| 6,754,332 B1 * | 6/2004 | Kneipp et al. | 379/265.13 |
| 6,754,334 B2 | 6/2004 | Williams et al. | |

(Continued)

FOREIGN PATENT DOCUMENTS

| | | | |
|---|---|---|---|
| EP | 1 478 167 A | 11/2004 | |
| EP | 1 478 167 A2 | 11/2004 | |

OTHER PUBLICATIONS

Sharmistha Sarkar Das et al., Application of Automatic Speech Recognition in Call Classification, IEEE, 2002, pp. 3896-3899.

(Continued)

*Primary Examiner* — Hassan Phillips
*Assistant Examiner* — Ajay Cattungal
(74) *Attorney, Agent, or Firm* — Renner, Otto, Boisselle & Sklar, LLP (57) ABSTRACT

A virtual queuing system and method provides for dynamic control of queue data in accordance with queue control instructions provided by a separate queue control source. The virtual queuing system comprises an interface to a queuing system and an interface to the separate queue control source. The interface to the queuing system provides for obtaining queue data and controlling the queue data in accordance with the queue control instructions provided by a separate queue control source. The interface to the separate queue control source for: i) providing the queue data to the separate queue control source; and ii) obtaining the queue control instructions there from.

34 Claims, 8 Drawing Sheets

(56) References Cited

U.S. PATENT DOCUMENTS

| | | | |
|---|---|---|---|
| 6,766,013 B2 | 7/2004 | Flockhart et al. | |
| 6,772,202 B2* | 8/2004 | Wright | 709/219 |
| 6,829,331 B2 | 12/2004 | Cullis | |
| 6,850,602 B1 | 2/2005 | Chou | |
| 6,882,641 B1* | 4/2005 | Gallick et al. | 370/356 |
| 6,898,190 B2* | 5/2005 | Shtivelman et al. | 370/270 |
| 7,174,011 B2 | 2/2007 | Kortum et al. | |
| 7,245,716 B2* | 7/2007 | Brown et al. | 379/266.01 |
| 7,787,610 B1* | 8/2010 | Williams et al. | 379/265.02 |
| 2002/0131399 A1* | 9/2002 | Philonenko | 370/351 |
| 2003/0083875 A1 | 5/2003 | Brown et al. | |
| 2003/0103619 A1* | 6/2003 | Brown et al. | 379/266.01 |
| 2003/0108162 A1* | 6/2003 | Brown et al. | 379/88.01 |
| 2004/0002865 A1 | 1/2004 | Chan et al. | |
| 2004/0243480 A1* | 12/2004 | Gross | 705/26 |
| 2005/0129217 A1 | 6/2005 | McPartlan et al. | |
| 2005/0232246 A1* | 10/2005 | Dowling | 370/352 |
| 2006/0067506 A1* | 3/2006 | Flockhart et al. | 379/265.09 |
| 2006/0146987 A1* | 7/2006 | Haukilahti | 379/67.1 |
| 2006/0256949 A1 | 11/2006 | Noble | |
| 2007/0041565 A1* | 2/2007 | Williams et al. | 379/265.02 |
| 2007/0130313 A1* | 6/2007 | King | 709/223 |
| 2007/0219816 A1* | 9/2007 | Van Luchene et al. | 705/1 |
| 2007/0230683 A1* | 10/2007 | Brown et al. | 379/266.01 |

OTHER PUBLICATIONS

Harry Levit, PhD, Noise Reduction in Hearing Aids: An Overview, Journal of Rehabilitation Research and Development, vol. 38, No. 1, Jan./Feb. 2001.

Steve Borne, Ringback Tones, Revenue at our Doorstep, Wireless Business and Technology, Oct. 6, 2004, www.sys-con.com.

Rednova, Globe Telecom's Ringback Tone Service Surpasses 100,000 Subscriber in the First Week of Launch, www.rednova.com, Apr. 27, 2004.

Sunmicrosystems, Ringback Tones help Carriers Dial Up New Profits, Boardroom Minutes, Aug. 2004, www.sun.com.

Jefferson Graham, Cell Phone Users Provide Musical Interlude for Callers, USA Today, Dec. 7, 2004, www.usatoday.com.

International Search Report for corresponding International Application No. PCT/US08/075541, dated Feb. 26, 2009.

Written Opinion for for corresponding International Application No. PCT/US08/075541, dated Feb. 26, 2009.

European Search Report for European Application No. 06816246.0, dated Apr. 7, 2009.

International Search Report for corresponding Application No. PCT/US08/67080 mailed Oct. 6, 2008.

Written Opinion for corresponding Application No. PCT/US08/67080 mailed Oct. 6, 2008.

U.S. Appl. No. 11/246,409, filed Oct. 7, 2005, for Automated System and Method for Distinguishing Audio Signals Received in Response to Placing and Outbound Call.

U.S. Appl. No. 11/901,186, filed Sep. 14, 2007, for Expected Wait Time System With Dynamic Array.

U.S. Appl. No. 11/143,857, filed Jun. 2, 2005, for Expected Wait Time Augmentation System and Method.

U.S. Appl. No. 11/206,723, filed Aug. 18, 2005, for Resource Based Queue Management System and Method.

International Preliminary Report on Patentability for corresponding International Application No. PCT/US2008/067080, dated Sep. 7, 2009.

* cited by examiner

| Resource 30 | Expected Wait Time 32 | Select |
|---|---|---|
| Resource A | xx minutes | ☐ |
| Resource B | yy minutes | ☐ |
| Resource C | zz minutes | ☐ |

Enter Client ID

Enter Call Back Number

Enter Specific Time

Figure 7

Press 1 to Manage Your Queue Position ~ 104
└ Press 1 for your expected wait time ~ 106
　Press 2 to schedule a call back ~ 108
　Press 3 to change an existing scheduled call back ~ 110
　Press 4 to delete an existing scheduled call back ~ 112

Figure 8

ACCESSORY QUEUE MANAGEMENT SYSTEM AND METHOD FOR INTERACTING WITH A QUEUING SYSTEM

TECHNICAL FIELD

The present invention relates to managing the queuing of clients waiting to be connected to a resource for servicing. More particularly, the present invention relates to systems for enabling a queue control system to obtain and control queue data to effect handling of clients waiting to be connected to a resource.

BACKGROUND OF THE INVENTION

Automatic call director (ACD) technology is a well known technology that: i) accepts incoming calls from calling clients; ii) queues calling clients on-hold for connection to a service representative; and iii) when a service representative is available, connects the client from the queue to the available service representative.

In advanced ACD systems service representatives may be organized in sub-groups and the ACD may maintain separate queues of calling clients for each sub-group. When a service representative within a sub-group is available, the ACD connects the client from the queue (for such sub-group) to the available service representative.

As an example, service representatives may be organized in sub-groups based on a skill set. A skill set may be based on the representatives ability to handle client issues such as billing issues on existing accounts, customer services issues on existing accounts, and opening of new accounts.

Typically menu choices enable a calling client to identify the issue for which the client requires service and the client is then queued for a resource capable of handling the identified issue. As such, it is expected that clients who identify the purpose of their call as a "billing issue" will be queued for, and connected to, a service representative with the ability to handle billing issues. Similarly, it is expected that: i) clients who identify the purpose of their call as a "customer service issue" will be queued for, and connected to, a service representative with the ability to handle customer service issues; and ii) clients who identify the purpose of their call as a "open a new account" will be queued for, and connected to, a service representative with the ability to open a new account.

Utilizing such a system makes it quite possible for a calling client to first be connected to a service representative that can not handle all or part of the calling clients issue(s).

For example, a client calling for a billing issue may improperly be connected to a service representative who only handles customer service issues. Such improper connection may be caused by the calling client selecting improper menu choices within the ACD menu.

As another example, a customer calling for a combination of a billing issue and a customer service issue may first be connected to a service representative capable of handling only the billing issue portion of the combination.

When a client is connected to a service representative with the wrong skill set, the matter is typically handled by the service representative transferring the call to the proper resource group which effectively queues the client for the proper resource.

The same technique is used for a calling client that has multiple issues. After first connecting to a first service representative for handling of a first issue, the first service representative needs to transfer the client to a second customer service representative for handling of a second issue.

A problem with this technique is that the amount of time a client waits in each queue can be quite lengthy, particularly during times at which many clients are calling the call center. Having to wait in queue multiple times can be exasperating.

In an effort to reduce customer exacerbation caused by having to maintain a connection while on-hold in queue, secondary queue systems have been developed. A typical secondary queue system obtains a telephone number at which the calling client can be reached when a service representative is available. The client disconnects, and then, at the proper time, a call back system establishes a connection to the client and couples the client to an available representative without waiting on-hold in queue. One exemplary system is disclosed in U.S. Pat. No. 6,563,921 to Williams et al. which is commonly assigned with the present application.

While such a system may make the experience of waiting for multiple service representative slightly less exacerbating, the client still must be queued multiple times.

Therefore, what is needed is an accessory virtual queuing system and method for interacting with a secondary queue that enables a queue control source, such as a system operated by a service representative or other resource, to obtain queue data and control the queue data in a manner that enables a service representative or other resource to initiate connection to a differing resource without suffering the disadvantages of doing so utilizing present technology.

SUMMARY OF THE INVENTION

A first aspect of the present invention comprises a virtual queuing system for dynamic control of queue data in accordance with queue control instructions provided by a separate queue control source. The virtual queuing system comprises an interface to a queuing system and an interface to the separate queue control source.

The interface to the queuing system provides for obtaining the queue data and dynamically controlling the queue data in accordance with queue control instructions provided by the separate queue control source.

The interface to the separate queue control source provides for presenting the queue data and obtaining the queue control instructions there from.

In exemplary embodiments, the queue data may be a real time indication of queue activity, data representing historical queue activity, and/or data representing projected queue activity.

In one sub embodiment, the separate queue control source may be controlled by a resource for which the queuing system is queuing clients for connection. In such sub embodiment, the interface to the separate queue control source may comprise a TCP/IP connection. As such, i) providing queue control data may comprise embedding the queue control data in a web document provided to a browser client of the resource; and ii) obtaining the queue control instructions may comprise obtaining a post of the queue control instructions from the resource.

The queue control instructions may comprise any combination of: i) instructions to add a client to a particular queue; ii) reposition a client within a queue; and iii) remove a client from a queue.

A second aspect of the present invention comprises a virtual queuing system for dynamic control of queue data in accordance with queue control instructions provided by a separate queue control source. Again, the virtual queuing system comprises an interface to a queuing system and an interface to the separate queue control source.

In this second aspect, the interface to the separate queue control source provides for: i) obtaining an indication of a selected resource for which queue management is desired; ii) presenting the queue data associated with the selected resource; and iii) obtaining the queue control instructions.

The interface to the queuing system provides for obtaining the queue data associated with the selected resource and controlling the queue data associated with the selected resource in accordance with the queue control instructions provided by the separate queue control source.

Again, in exemplary embodiments, the queue data may be a real time indication of queue activity, data representing historical queue activity, and/or data representing projected queue activity.

Again, in a sub embodiment, the separate queue control source may be controlled by a resource for which the queuing system is queuing clients for connection. In such sub embodiment, the interface to the separate queue control source may comprise a TCP/IP network connection. As such, i) providing queue control data may comprise embedding the queue control data in a web document provided to a browser client of the resource; and ii) obtaining the queue control instructions may comprise obtaining a post of the queue control instructions from the resource.

Again, queue control instructions may comprise any combination of: i) instructions to add a client to a particular queue; ii) reposition a client within a queue; and iii) remove a client from a queue.

A third aspect of the present invention comprises a method of operating a virtual queuing system for dynamic control of a queuing system. The method comprises: i) obtaining queue data from the queuing system; ii) presenting the queue data to a separate queue control source; iii) obtaining queue control instructions from the separate queue control source; and iv) controlling the queuing system in accordance with the queue control instructions obtained from the separate queue control source.

Again, in exemplary embodiments, the queue data may be a real time indication of queue activity, data representing historical queue activity, and/or data representing projected queue activity.

The step of presenting queue data to a separate queue control source may comprise: i) embedding the queue control data in a web document; and ii) providing the web document to the separate queue control source over a TCP/IP network.

The step of obtaining the queue control instructions may comprise obtaining a post of the queue control instructions from a browser client of the resource.

Again, queue control instructions may comprise any combination of: i) instructions to add a client to a particular queue; ii) reposition a client within a queue; and iii) remove a client from a queue.

For a better understanding of the present invention, together with other and further aspects thereof, reference is made to the following description, taken in conjunction with the accompanying drawings. The scope of the present invention is set forth in the appended claims.

DETAILED DESCRIPTION OF THE EXEMPLARY EMBODIMENTS

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Figure 1:
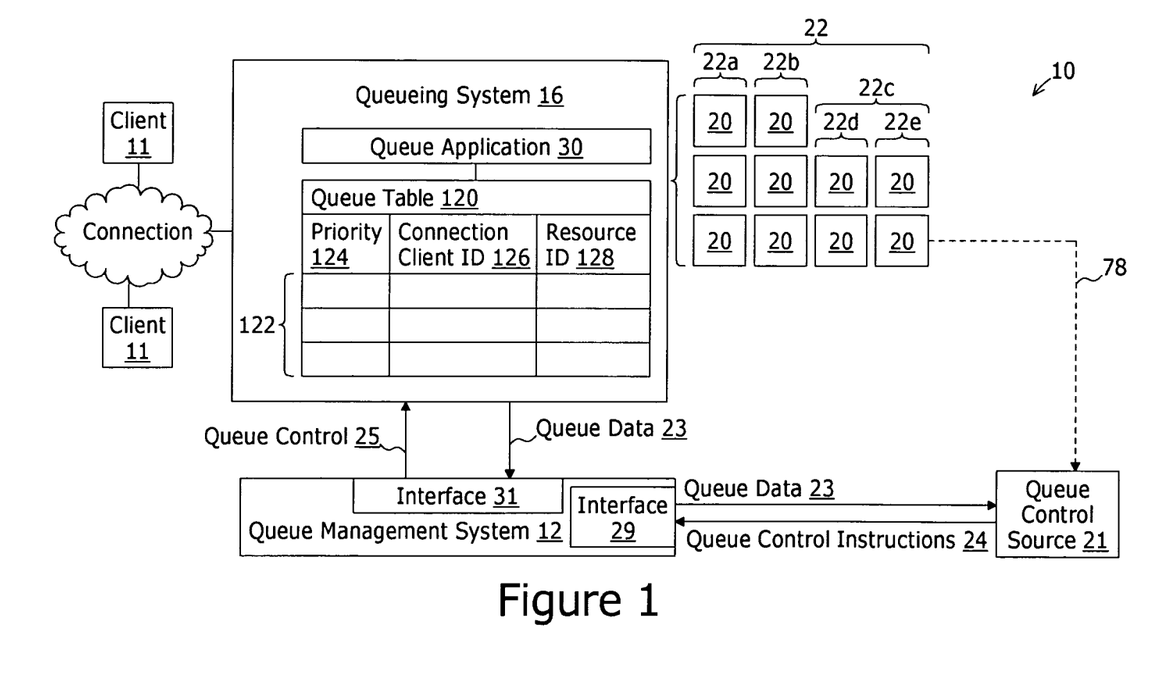
FIG. 1 is a block diagram representing an exemplary architecture for operation of an accessory virtual queuing system for enabling a queue control source to control queuing of clients in accordance with one embodiment of the present invention.

FIG. 1 represents an architecture 10 for operation of an accessory virtual queuing system 12 for enabling a queue control source 21 to control queuing of clients 11 within a queuing system 16. The clients 11 may be telephony connections established over the traditional PSTN circuits or communication sessions established utilizing alternative technologies such as Voice over Internet Protocol (VoIP) or other web interactions.

In an exemplary embodiment, the queuing system 16 may queue the clients 11 for multiple resources 20. Each of the resources 20 may be a service representative system for enabling a service representative to take a call from a client 11 and service the requests of client 11. The resources 20 may be organized in a single resource group or the resources 20 may be divided into multiple resource groups 22 based on the skill set of the service representatives using the resources 20.

For example, each of the resources 20 may include similar structure for enabling a service representative to perform his or her duties, however, resource group 22a may be resources 20 which are capable of handling customer billing issues, resource group 22b may be resources 20 which are capable of handling customer service issues while resource group 20c may be resources 20 which are capable of handling customer technical issues. Subgroup 22d may be resources 20 operated by service representatives with a first technical skill for handling a first type of technical problems while subgroup 22e may be resources 20 with a second technical skill for handling a second type of technical problems.

The queuing system 16 may include a queuing table 120 or other similar means for maintaining the order in which clients 11 are queued for resources 20 and the resource group 22a-22e for which each client 11 is queued.

In more detail, the queuing table may include a plurality or records 122. Each connecting client 11 is associated with a record and assigned a priority number 124 reflecting the order in which the client connections are established and/or an order in which client connections are to be coupled to available resources 20. The priority number 124 may be an incremental index number.

Associated in the record 122 may be a connection and/or client identifier 126 and a resource identifier 128 which identifies the resource 20 or resource group 22a-22e to which the client 11 is to be connected.

A queue application 130 connects the next client queued for a particular resource 20 or resource group 22a-22e to the appropriate resource 20 when such appropriate resource becomes available.

For example, if the queuing system 16 is implemented as a traditional automated call director (ACD), telephony connections from clients 11 (whether traditional or alternative web based technologies) will be maintained "on-hold" until a resource 20 is available.

When a resource 20 becomes available, the next client 11 is connected to the resource 20 by the queue application 130 locating the correct connection by reference to the queue table 120. More particularly, the record representing the next client 11 in the queue (e.g. based on the priority number 124) that includes a resource ID 128 which corresponds to the available resource 20 is selected for connection to the available resource 20.

Figure 2:
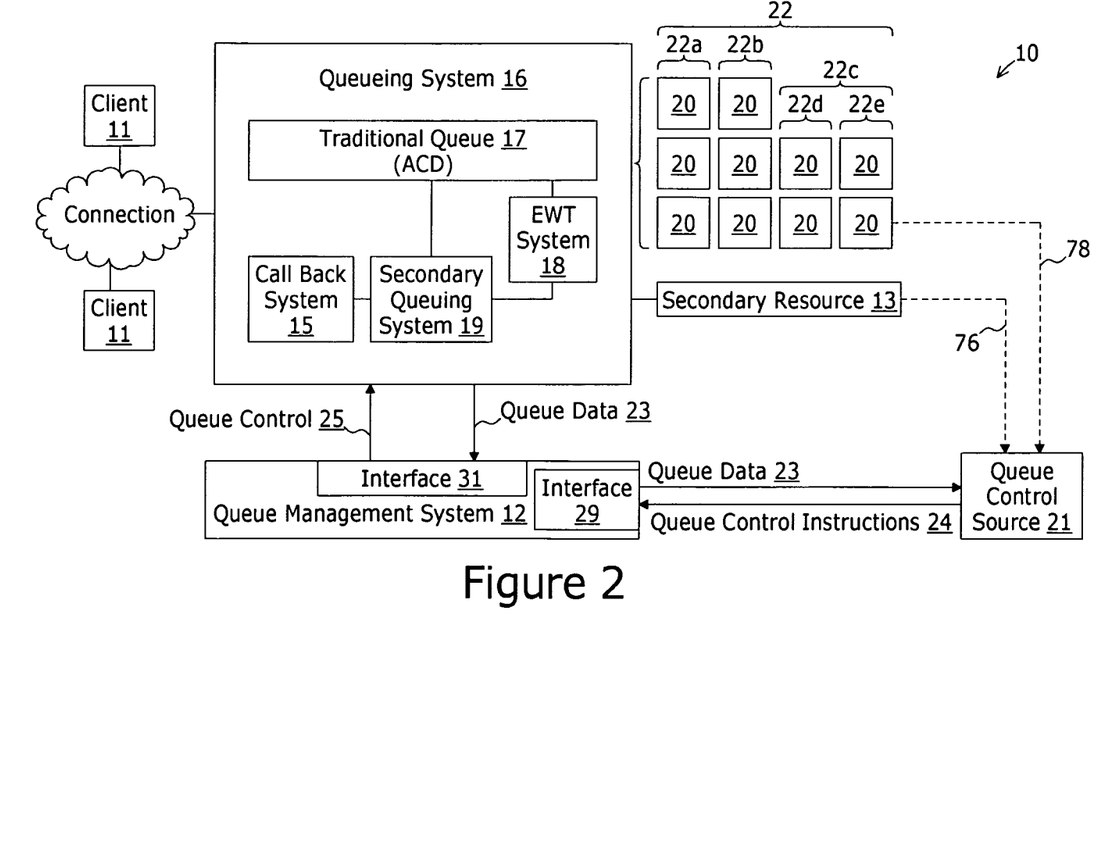
FIG. 2 is a block diagram representing a second exemplary architecture for operation of an accessory virtual queuing system for enabling a queue control source to control queuing of clients in accordance with one embodiment of the present invention.

Turning to FIG. 2, a second embodiment of a queuing system 16 may comprise a combination of: i) a traditional queue 17 (such as an ACD) for queuing clients 11 while maintaining the telephony connection (e.g. clients "on-hold"); ii) a secondary queuing system 19 for queuing clients 11 independent of whether the telephony connection is maintained; iii) a call back system 15 for establishing a telephony connection to a client 11 for which the original telephony connection from the client 11 to the queuing system 16 is not maintained while the client is in queue; and iv) an expected wait time system 18.

The traditional queue 17 may be embodied in a traditional automated call director (ACD) which queues clients "on-hold" waiting for a resource 20 within a particular resource group 22a-22e. In more detail, such an ACD may utilize known technology for receiving an incoming calls from a client 11 (e.g. establishing a client connection) and queuing client connections for connection to a resources 20 within the appropriate resource group 22a-22e and, when one of the resources 20 within the appropriate resource group 22a-22e becomes available, connecting a client from the queue to the to the available one of the resources 20.

The secondary queuing system 19 may be coupled to the traditional queue 17 as an accessory device. In general, the secondary queuing system 19 queues clients for connection to resources 20 within the appropriate resource group 22a-22e in a manner that does not require the client 11 to remain "on hold" while in the traditional queue 17. As examples, the secondary queuing system 19 may maintain a client's position in queue for a resource 20 within the appropriate resource group 22a-22e while: i) the client 11 takes advantage of services provided by a secondary resource 13 such as an information on-demand system; or ii) the client 11 disconnects and waits for a return call when an appropriate resource is available.

In the example wherein the secondary queuing system 19 maintains the client's position in queue while the client 11 takes advantage of a secondary resource 13, the secondary queue may, when the client 11 has completed his/her session with the secondary resource 13 and a primary resource 20 within the appropriate resource group 22a-22e is available, generate a priority connection to such available resource.

The priority connection may be: i) a transfer of the client connection to the traditional queue 17 with a command such that the traditional queue 17 connects the client to the next available one of the resources 20 within the required resource group 22a-22e (e.g. places the client at the front of the queue); or ii) a connection directly to the next available resources 20 within the required resource group 22a-22e (e.g. bypass of the traditional queue 17).

In the example wherein the secondary queuing system 19 maintains the client's position in the queue while the client 11 disconnects and waits for a return call when an appropriate resource is available, the secondary queue may: i) obtain a means for establishing a telephone connection to the client 11 (e.g. a call back number); and ii) at the appropriate time when a resource is available, induce the call back system 15 to establish a connection to the client 11 utilizing the call back number. Again, a priority connection may then be generated to the available resource 20 within the appropriate resource group 22a-22e.

Figure 4:
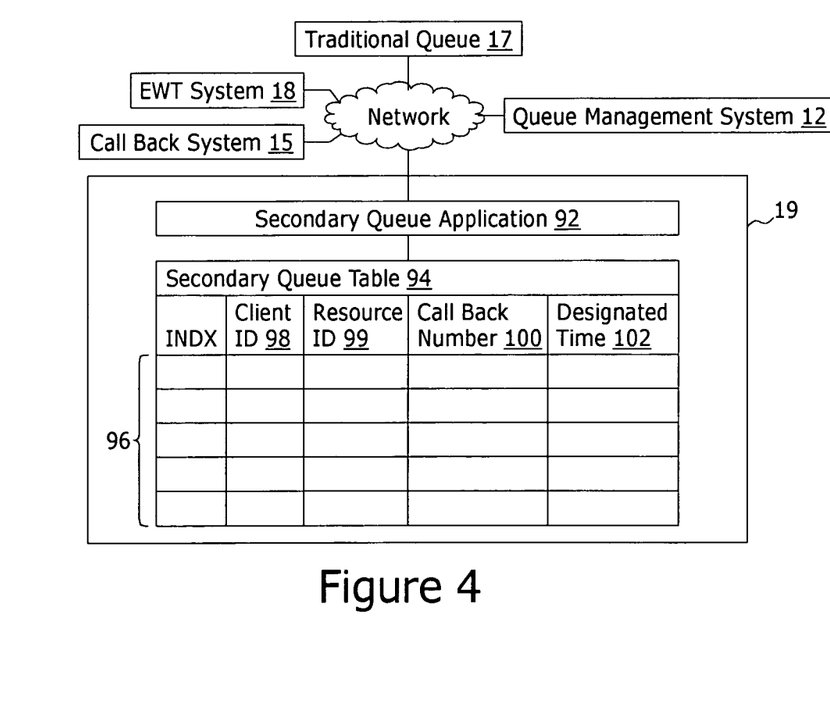
FIG. 4 is a block diagram representing a secondary queuing system in accordance with one embodiment of the present invention.

The block diagram for FIG. 4 represents an exemplary secondary queue system 19. Turning to FIG. 4, the secondary queue system 19 may comprise a secondary queue application 92 and a secondary queue table 94. The secondary queue table 94 maintains, for each client being handled by the secondary queuing system 19, call back information. In more detail, the secondary queue table 94 may comprise a plurality of records 96. Each record 96 associates a client identifier 98 with: i) a telephone number 100 to which a telephone connection may be established with the subject client at a designated time 102; and ii) a resource ID 99 identifying the resource 20, or resource group 22a-22e to which the client is to be connected. The designated time may be: i) derived from an expected wait time for the resource 20 or resource groups 22a-22e as provided by the expected wait time 18 system; or ii) a client specified scheduled time.

In one aspect, the secondary queue application 92 monitors the passage of time and, upon determining that time has advanced to the designated time 102 of one of the records 96 of the secondary queue table 94, drives the call back system 15 to establish a telephony connection to the subject client. Again, the telephony connection may be a traditional PSTN connection or a telephony connection using an alternative technology such as VoIP.

After establishing the telephony connection, the priority connection to a resource 20 within the required resource group 22a-22e is generated. As discussed, the priority connection may be: i) a transfer of the client connection to the traditional queue 17 with a command such that the traditional queue 17 connects the client to the next available one of the resources 20 within the required resource group 22a-22e (e.g. places the client at the front of the queue); or ii) a connection directly to the next available resources 20 within the required resource group 22a-22e (e.g. bypass of the traditional queue 17).

The expected wait time system 18 may be part of the secondary queue system 19, part of the traditional queue (ACD) 17, or a separate accessory system communicatively coupled to the secondary queue system 19 and the traditional queue (ACD) 17.

In operation, the expected wait time system 18 determines an expected wait time value representing the a time at which resources 20 within the particular resource group 22a-22e are expected to be available to service a client. Or stated another way, the duration of time expected for a resource 20 or resource group 22a-22e to handle all of the clients then currently queued for the resource 20 or resource group 22a-22e in either the traditional queue 17 or the secondary queuing system 19.

The expected wait time value may represent an estimated wait time calculated using traditional estimated wait time techniques such a projecting a wait time based on the quantity of clients in the queue and any of a historical, present, or projected time allotment for handling each such queued client. Alternatively, the expected wait time value may be a function of both a traditional estimated wait time calculation and a wait time augmentation calculation made based on resource availability and/or scheduled change in resource availability as disclosed on co pending patent application Ser. No. 11/143,857 filed on Jun. 2, 2005 and assigned to the same assignee as the present invention. Such patent application is incorporate herein by reference.

Figure 3:
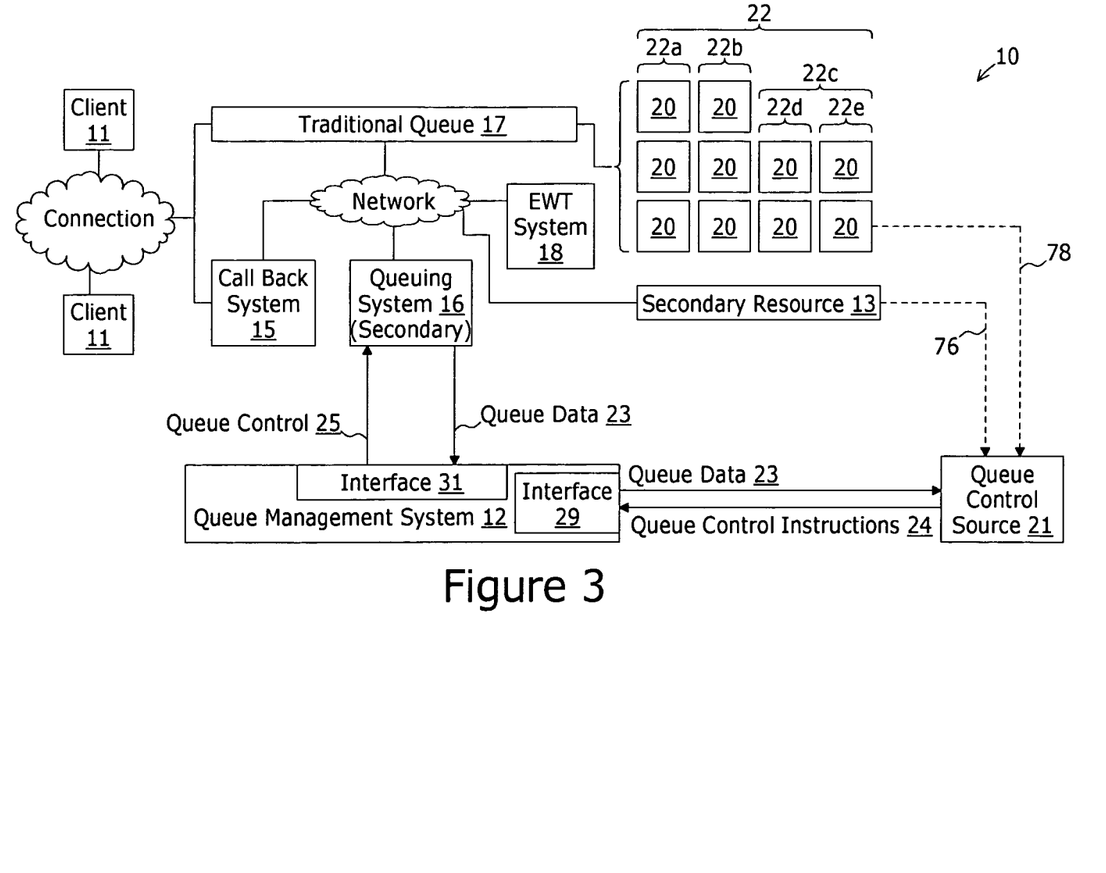
FIG. 3 is a block diagram representing a third exemplary architecture for operation of an accessory virtual queuing system for enabling a queue control source to control queuing of clients in accordance with one embodiment of the present invention.

Turning to FIG. 3, in a third embodiment the queuing system 16 may be an accessory interconnected, via a network, with permutations of: i) a traditional queue 17 (such as an ACD) for queuing clients 11 while maintaining the telephony connection (e.g. clients "on-hold"); ii) a call back system 15 for establishing a telephony connection to a client 11 for which the original telephony connection from the client 11 to the queuing system 16 is not maintained while the client is in queue; and iii) an expected wait time system 18.

Again, the traditional queue 17 may be embodied in a traditional automated call director (ACD) which queues clients "on-hold" waiting for a resource 20 within a particular resource group 22a-22e.

The accessory queuing system 16 may be a secondary queuing system, operating similarly to the secondary queuing system 19 of FIG. 2, for queuing clients for connection to resources 20 within the appropriate resource group 22a-22e in a manner that does not require the client 11 to remain "on hold" while in the traditional queue 17. The accessory queuing system 16 may maintain a client's position in queue for a resource 20 within the appropriate resource group 22a-22e while: i) the client 11 takes advantage of services provided by a secondary resource 13 such as an information on-demand system; or ii) the client 11 disconnects and waits for a return call when an appropriate resource is available.

In the example wherein the accessory queuing system 16 maintains the client's position in queue while the client 11 takes advantage of a secondary resource 13, the secondary queue may, when the client 11 has completed his/her session with the secondary resource 13 and a primary resource 20 within the appropriate resource group 22a-22e is available, generate a priority connection to such available resource.

The priority connection may be: i) a transfer of the client connection to the traditional queue 17 with a command such that the traditional queue 17 connects the client to the next available one of the resources 20 within the required resource group 22a-22e (e.g. places the client at the front of the queue); or ii) a connection directly to the next available resources 20 within the required resource group 22a-22e (e.g. bypass of the traditional queue 17).

In the example wherein the accessory queuing system 16 maintains the client's position in the queue while the client 11 disconnects and waits for a return call when an appropriate resource is available, the secondary queue may: i) obtain a means for establishing a telephone connection to the client 11 (e.g. a call back number); and ii) at the appropriate time when a resource is available, induce the call back system 15 to establish a connection to the client 11 utilizing the call back number. Again, a priority connection may then be generated to the available resource 20 within the appropriate resource group 22a-22e.

The secondary queuing aspects of the accessory queuing system 16 may be structured similarly to the secondary queuing system 19 discussed with respects to FIGS. 2 and 4.

Virtual Queuing System

Referring to FIGS. 1, 2, and 4, the virtual queuing system 12 the enables a separate control source 21 to obtain (including view) queue data 23 maintained by the queuing system 16 and provide queue control instruction 24 for effecting queue control 25 of such queue data 23.

The queue data 23 may be, for any combination of one or more resources 20 or resource groups 22a-22e; i) one or more data elements of records of the one or more of the queue table 120 (FIG. 1) or the secondary queue table 94 (FIG. 4) (e.g. real time queue data); ii) historical statistics related to queue operations and resource handling of clients 11 over a designated or predetermined period of time; and iii) projected queue activity including projected resource handling of clients 11 over a designated or predetermined period of time—which may be calculated from combinations of historical statistics and real time queue data.

The queue control instructions 24 may be any of combination of instructions for effecting the removal of existing queue data 23, modification to existing queue data 23, or inclusion of additional queuing data 23.

For example, the separate control source 21 may be a system available to a resource 20 as represented by reference numeral 78. As such, the resource 20 may be able to obtain and view existing queue data for exemplary purposes which include, but are not limited to, adding a client 11 to a queue for a particular resource 20 or resource groups 22a-22e (e.g. writing a new record 122 to the queue table 120); repositioning a client within a queue (moving or modifying a record 122 within the queue table 120 or changing a records priority number 124 (or designated time 102 of FIG. 4)); or removing a client from a queue (e.g. deleting a record 122 (or a record 96 of FIG. 4) or tagging the record in a manner to indicate that the client 11 no longer requires service).

A practical application may include a situation wherein a client is connected to a first resource 20 that is unable to handle all or part of the client's requests. Such first resource 20 may add such client to the queue for the appropriate resource 20, or resource groups 22, for handling the request. Further, a priority 124 may be designated to eliminate or reduce the client's wait time in queue.

As another example, the separate control source 21 may be a system available to the secondary resource as represented by reference numeral 76. As such, when a client 11 is taking advantage of the secondary resource 13, the client, through the secondary resource 13, may be able to obtain certain existing queue data for exemplary purposes which include, but are not limited to, adding himself/herself to a queue for a particular resource 20 or resource groups 22a-22e; repositioning himself/herself within a queue; or removing himself/herself from a queue.

The virtual queuing system 12 may comprise an interface 31 to the queuing system 16 and an interface 29 to the separate queue control source 21.

The interface 31 to the queuing system 16 may provide for: i) obtaining the queue data 23; and ii) effecting queue control 25—in accordance with queue control instructions 24 provided by the separate queue control source 21.

The interface 29 to the separate queue control source 21 may provide for: i) presenting the queue data 23 to the separate queue control source 21; and ii) obtaining the queue control instructions 24.

Figure 5:
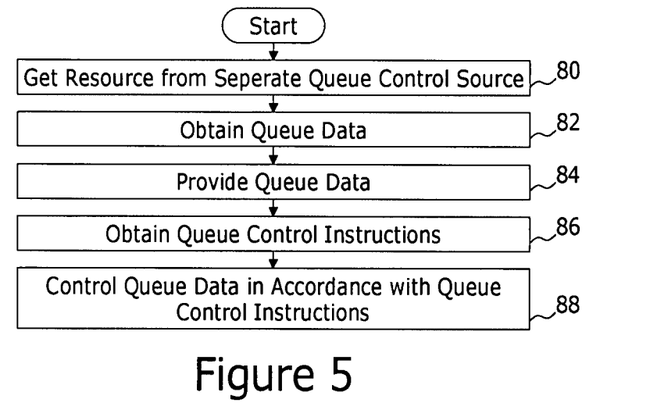
FIG. 5 is a flow chart representing exemplary operation of a virtual queuing system in accordance with one embodiment of the present invention.

The flow chart of FIG. 5 represents exemplary aspects of operation of the virtual queuing system 12. Turning to FIG. 5 in conjunction with FIGS. 1, 2, and 3, step 80 may comprise obtaining, from the separate queue control source 21 identification of a particular resource 20 or resource group 22a-22e for which queue data 23 is to be provided to the separate queue control source 21.

Step 82 may comprise obtaining, from the queuing system 16, queue data 23. The queue data 23 may be for all resources 20 or all resource groups 22a-22e—or may be for only those resource(s) 20 or resource group(s) 22a-22e identified at step 80. The queue data 23 may be, for any combination of one or more resources 20 or resource groups 22a-22e; i) one or more data elements of records of the queue table 120 and/or secondary queue table 94 (FIG. 4) (e.g. real time queue data); ii) historical statistics related to queue operations and resource handling of clients over a designated or predetermined period of time; and iii) projected queue activity including projected resource handling of clients over a designated or predetermined period of time—which may be calculated from combinations of historical statistics and real time queue data.

Step 84 may comprise providing the queuing data 23 to the queue control source 21—for viewing by the resource 20.

Step 86 may comprise obtaining, from the queue control source 21, the queue control instructions 24. As discussed, the queue control instructions 24 may be any of combination of instructions for effecting the removal of existing queue data 23, modification to existing queue data 23, or inclusion of additional queuing data 23.

Step 88 represents effecting queue control 25 in accordance with the queue control instructions 24.

In one exemplary embodiment, the interface 29 to the separate queue control source 21 may be a web server and the queue control source 21 may be a web browser on a system available to a resource 20. The connection between the interface 29 and the queue control source 21 may be a TCP/IP network connection.

Figure 6:
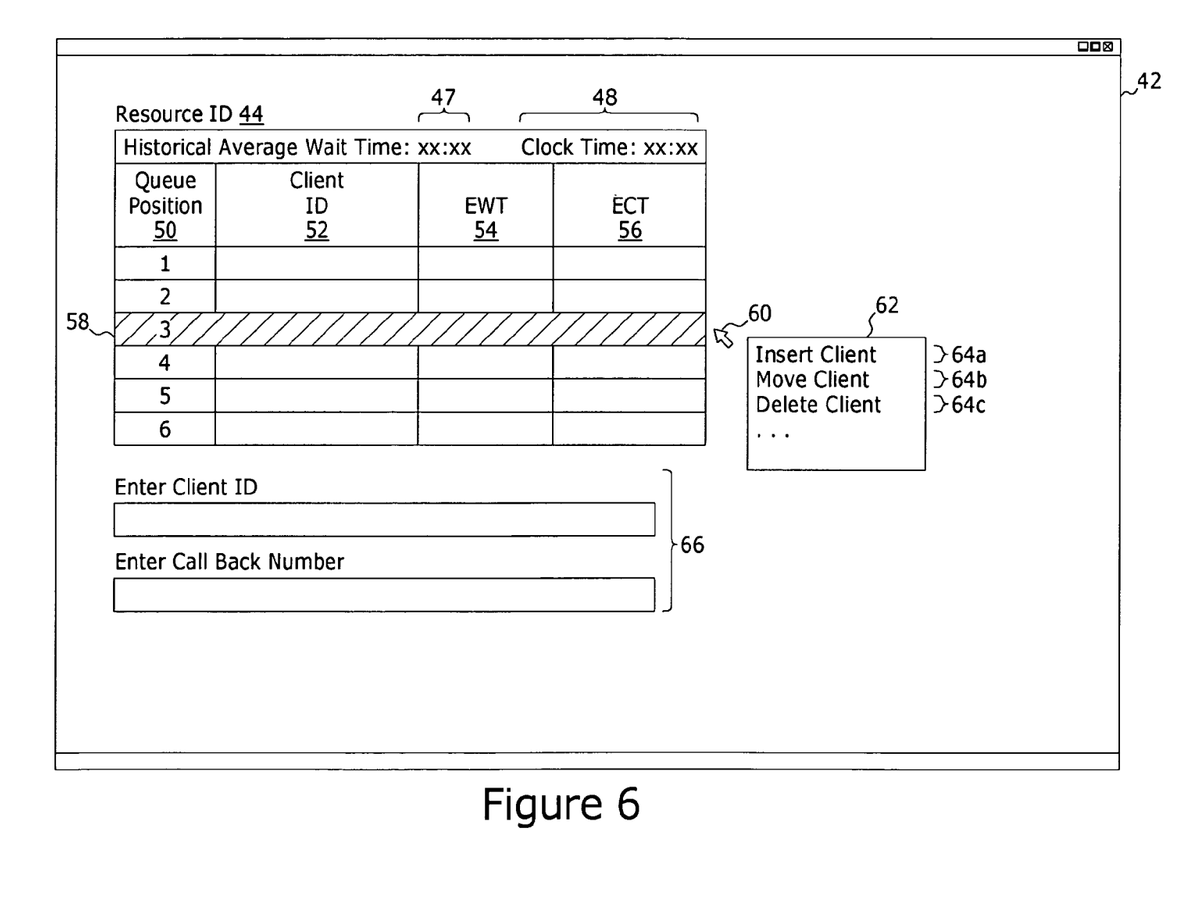
FIG. 6 is diagram representing an exemplary web document of providing queue data and obtaining queue control instructions in accordance with one embodiment of the present invention.

In such an embodiment, with brief reference to FIG. 6 in conjunction with FIGS. 1, 2, and 3, providing queuing data 23 to the remote queue control source 21 may comprise populating the queue data 23 into a web page document 42 for browser rendering at the queue control source 21. And, obtaining the queue control instructions 24 may comprise use of embedded controls within the web page document 42 for obtaining user entry of the queue control instructions 24 and posting of such queue control instructions 24 back to the web server.

The exemplary document 42 may include a resource ID 44 identifying the resource 20 or resource group 22a-22e for which the queue data 23 is applicable. The queuing data 23 may be in a table form showing, for each of a plurality of queued clients, the queue position 50, the client ID 52, the client's expected wait time 54 (e.g. duration), and/or the clients expected connection time 56. Other information may include: i) a historical average wait time 47 which may be based on recent wait times or wait times experienced during similar time periods, for examples typical wait times experienced on Monday mornings; and ii) a clock time 48 useful for evaluating a clients expected connection time 56.

The document 42 may further include embedded controls for obtaining the queue control instructions 24. In the example of FIG. 6, the embedded controls comprise a highlight bar 58 for selecting a client within the queue using a mouse cursor 60, a menu table 62 comprising control instructions 64a-64c such as: i) control instruction 64a which represents an instruction to insert a client before (or after) the client identified by the highlight bar 58; ii) control instruction 64b which represents an instruction to move the client identified by the highlight bar 58; and iii) control instruction 64c which represents an instruction to delete the client identified by the highlight bar 58.

For purposes of inserting a client, additional manual data entry (MDE) controls 66 may be used for entering such data as the client ID, call back telephone number, etc.

Figure 7:
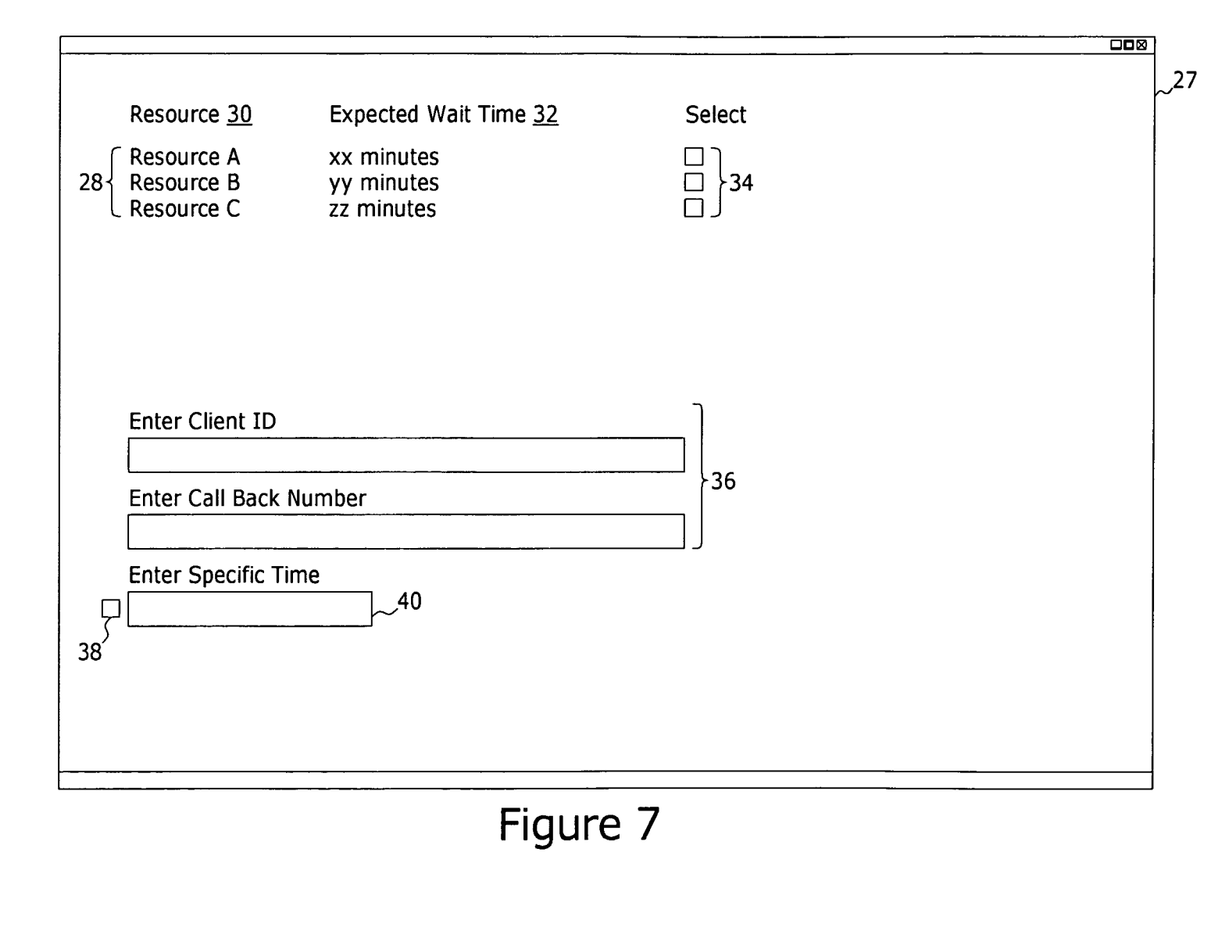
FIG. 7 is diagram representing a second exemplary web document of providing queue data and obtaining queue control instructions in accordance with one embodiment of the present invention.

Turning to FIG. 7 in conjunction with FIGS. 1, 2, and 3 a second exemplary web page document 27 is represented. The exemplary web page document 27 may include a table wherein each row 28 includes a resource identifier 30 identifying a resource 20 or resource group 22a-22e. Associated with such identifier 30 is an expected wait time value 32.

The embedded controls for obtaining the queue control instructions 24 may include: i) check boxes 34 for enabling selection of one of a resource 20 or resource group 22a-22e (identified by its resource identifier 30); and ii) manual data entry (MDE) controls 36 which may be used for entering such data as the client ID, call back telephone number, etc for adding a client to the queue associated with the selected resource. Further, check box 38 and MDE control 40 may be used for entering a specific call back time and adding the client to the queue associated with the selected resource.

Returning to FIGS. 2 and 3, in an exemplary embodiment, wherein the queue control source 21 is available to a client 11 through the secondary resource 13, the interface 29 between the virtual queuing system 12 and the queue control source 21 may be any applicable data interface. In such embodiment, the queue control source 21 may present the queue data 23 and obtain queue control instructions 24 by providing the client with a DTMF menu.

Figure 8:
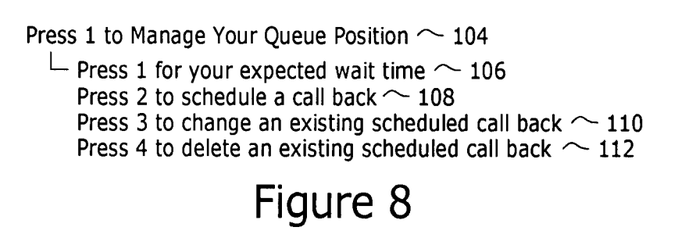
FIG. 8 is a diagram representing an exemplary menu system for obtaining queue control instructions in accordance with one embodiment of the present invention.

Turning briefly to FIG. 8 in conjunction with FIGS. 2 and 3, an exemplary DTMF menu is shown. At a first level, the menu may provide a selection 104 enabling a client to obtain certain queue data 23 and manage his/her queue position. Sub-menu choices may include selections for: i) obtaining an estimate of expected wait time 106, ii) scheduling a call back 108; iii) alter an existing scheduled call back time; and iv) to delete an existing scheduled call back time.

In summary, it should be appreciated that the systems of the present invention enable management of the connections of clients to applicable resources in a manner more efficient that known system. Although the invention has been shown and described with respect to certain exemplary embodiments, it is obvious that equivalents and modifications will occur to others skilled in the art upon the reading and understanding of the specification.

For example, the diagrams of FIGS. 5 and 6 represent a design choice of a web document for presenting queue data and obtaining queue control instructions. It is envisioned that those skilled in the art would readily implement other designs for web documents for the efficient presentation of queue data and posting of queue control instructions to the web server utilizing any known web page technology including, but not limited to HTML, JSP, and ASP.

As another example, the diagram of FIG. 4 represents the virtual queuing system 12 communicatively coupled to the secondary queue application 19 via a network. Those skilled in the are recognize that the functions associated with the virtual queuing system 12 can readily be implemented in the same hardware as the secondary queue application.

The present invention includes all such equivalents and modifications, and is limited only by the scope of the following claims.

What is claimed is:

1. A virtual queuing system for dynamic control of queue data in accordance with queue control instructions provided by a separate queue control source available to a second resource, the virtual queuing system comprising:
   an interface to a queuing system for:
      obtaining queue data for a queue for a first resource, wherein the first resource is the first resource for which clients are being queued; and
      controlling the queue data for the first resource in accordance with the queue control instructions provided by the separate queue control source; and
   an interface to the separate queue control source for:
      providing the queue data for the first resource; and
      obtaining the queue control instructions from the second resource for controlling the queue data for the first resource, wherein the second resource is the second resource for which clients are being queued.

2. The virtual queuing system of claim 1, wherein the queue data is a real time indication of queue activity.

3. The virtual queuing system of claim 1, wherein the queue data comprises data representing historical queue activity.

4. The virtual queuing system of claim 1, wherein the queue data comprises data representing projected queue activity.

5. The virtual queuing system of claim 1, wherein the separate queue control source is controlled by the second resource for which clients are being queued by the queuing system.

6. The virtual queuing system of claim 1, wherein:
   the interface to the separate queue control source comprises a TCP/IP network connection;
   providing queue data comprises embedding the queue data in a web document provided to a web browser client of the second resource; and
   obtaining the queue control instructions comprises obtaining a post of the queue control instructions from the web browser client of the second resource.

7. The virtual queuing system of claim 6, wherein the queue control instructions comprise instructions to add a client to the queue for the first resource.

8. The virtual queuing system of claim 6, wherein the queue control instructions comprise instructions to reposition a client within the queue for the first resource.

9. The virtual queuing system of claim 6, wherein the queue control instructions comprise instructions to remove a client from the queue for the first resource.

10. The virtual queuing system of claim 1, wherein the queue data for the first resource is controlled by the separate queue control source to maintain the position of a client in the queue for the first resource while the client is connected to the second resource.

11. The virtual queuing system of claim 1, wherein the instructions for controlling the queue data for the first resource are provided by the second resource; and
   wherein the instructions for controlling the queue data for the first resource include instructing the separate queue control source to generate a priority connection to the first resource.

12. The virtual queuing system of claim 1, wherein the queue control instructions are provided by the client through the separate queue control source.

13. A virtual queuing system for dynamic control of queue data in accordance with queue control instructions provided by a separate queue control source available to a second resource, the virtual queuing system comprising:
   an interface to the separate queue control source for:
      obtaining an indication of a selected resource, wherein the selected resource is the resource for which clients are being queued;
      providing queue data associated with a queue of the selected resource; and
      obtaining the queue control instructions from the second resource; and an interface to a queuing system for:
      obtaining the queue data associated with the queue of the selected resource; and
      controlling the queue data associated with the selected resource in accordance with the queue control instructions provided by the separate queue control source, wherein the separate queue control source obtains the queue control instructions from the second resource for controlling the queue data for the selected resource.

14. The virtual queuing system of claim 13, wherein the queue data is a real time indication of queue activity.

15. The virtual queuing system of claim 13, wherein the queue data comprises data representing historical queue activity.

16. The virtual queuing system of claim 13, wherein the queue data comprises data representing projected queue activity.

17. The virtual queuing system of claim 13, wherein the separate queue control source is controlled by the resource for which clients are being queued by the queuing system.

18. The virtual queuing system of claim 17, wherein:
   the interface to the separate queue control source comprises an TCP/IP network connection;
   providing queue data comprises embedding the queue data in a web document provided to a web browser client of the resource; and
   obtaining the queue control instructions comprises obtaining a post of the queue control instructions from the web browser client of the resource.

19. The virtual queuing system of claim 18, wherein queue control instructions comprise instructions to add a client to the queue for the selected resource.

20. The virtual queuing system of claim 18, wherein the queue control instructions comprise instructions to reposition a client within the queue for the selected resource.

21. The virtual queuing system of claim 18, wherein the queue control instructions comprise instructions to remove a client from the queue for the selected resource.

22. The virtual queuing system of claim 13, wherein the queue control instructions include maintaining the position of a client in the queue for the selected resource while the client is connected to the resource.

23. The virtual queuing system of claim 13, wherein the queue control instructions are provided by the client through the separate queue control source.

24. A method of operating a virtual queuing system for dynamic control of a queuing system, the method comprising:
obtaining queue data for a queue for a first resource from the queuing system, wherein the first resource is the first resource for which clients are being queued;
presenting the queue data to a separate queue control source that is available to a second resource;
obtaining queue control instructions from the separate queue control source from the second resource, wherein the second resource is the second resource for which clients are being queued; and
controlling the queuing system in accordance with the queue control instructions obtained from the separate queue control source, wherein the separate queue control source obtains the queue control instructions from the second resource for controlling the queue data for the first resource.

25. The method of claim 24, wherein the queue data is a real time indication of queue activity.

26. The method of claim 24, wherein the queue data comprises data representing historical queue activity.

27. The method of claim 24, wherein the queue data comprises data representing projected queue activity.

28. The method of claim 24, wherein:
presenting queue data to a separate queue control source comprises:
embedding the queue control data in a web document; and
providing the web document to the separate queue control source over a TCP/IP network; and
obtaining the queue control instructions comprises obtaining a post of the queue control data from a web browser client of the second resource.

29. The method of claim 28, wherein queue control instructions comprise instructions to add a client to the queue for the selected resource.

30. The method of claim 28, wherein the queue control instructions comprise instructions to reposition a client within the queue for the selected resource.

31. The method of claim 28, wherein the queue control instructions comprise instructions to remove a client from the queue for the selected resource.

32. The method of claim 24, wherein obtaining queue control instructions comprises instructions for maintaining the position of a client in the queue for the first resource while the client is connected to the second resource.

33. The method of claim 24, wherein the obtaining queue control instructions comprises providing the instructions by the second resource, and instructing the separate queue control source to generate a priority connection to the first resource.

34. The method of claim 24, wherein the obtaining queue control instructions comprises receiving the instructions from a client through the separate queue control source.

* * * * *